Feb. 5, 1952 T. A. GUESS 2,584,868
GRUBBING ATTACHMENT FOR TRACTORS
Filed Nov. 26, 1946 2 SHEETS—SHEET 1
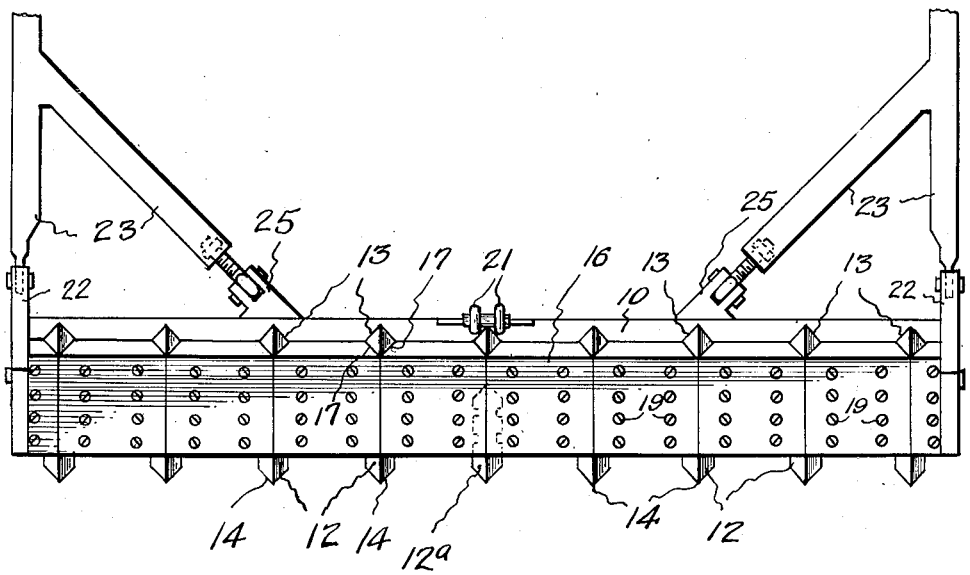
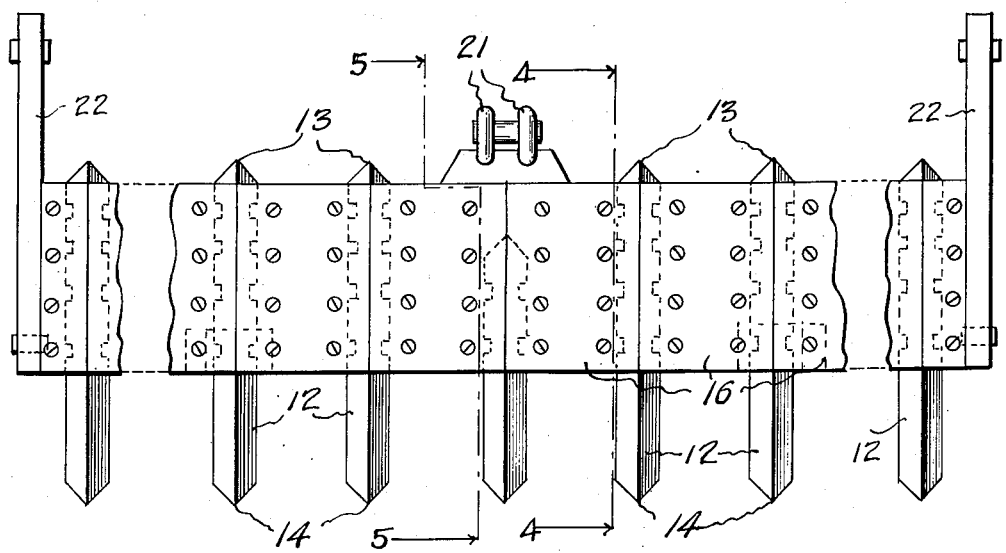
INVENTOR.
TAYLOR A. GUESS
BY
Soterios Nicholson Feb. 5, 1952     T. A. GUESS     2,584,868
GRUBBING ATTACHMENT FOR TRACTORS
Filed Nov. 26, 1946     2 SHEETS—SHEET 2

INVENTOR.
TAYLOR A. GUESS
BY
*Soterios Nicholson*

Patented Feb. 5, 1952

2,584,868

UNITED STATES PATENT OFFICE 2,584,868

GRUBBING ATTACHMENT FOR TRACTORS

Taylor A. Guess, Kensington, Ga.

Application November 26, 1946, Serial No. 712,311

1 Claim. (Cl. 37—2)

This invention relates to a grubbing attachment for tractors, and has for one of its objects the production of a simple and efficient means for supporting the teeth of the grubbing attachment on a frame which is adapted to be supported on the front of a tractor or other vehicle, to provide a pusher-type or crawler-type implement.

A further object of this invention is the production of a simple and efficient tooth-supporting means for a grubbing attachment to facilitate the mounting and replacement of the teeth when repairs are necessary.

Other objects and advantages of the present invention will appear throughout the following specification and claim.

In the drawings:

Figure 1 is a top plan view of the attachment;

Figure 2 is a front elevational view thereof;

Figure 3:
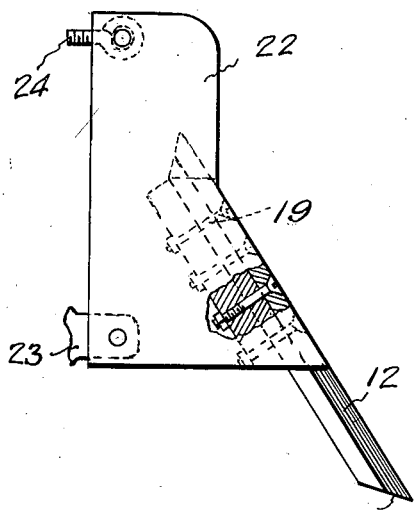
Figure 3 is an end elevational view, partly in section.
Figure 4:
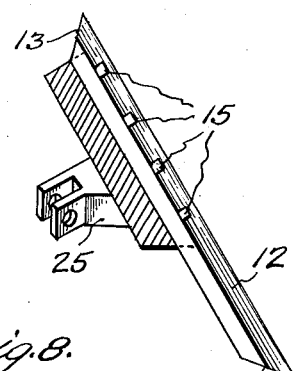
Figure 4 is a sectional view taken on line 4—4 of Figure 2.

By referring to the drawings, it will be seen that 10 designates the base plate of the attachment, which may be of any desired length or width depending upon the kind and the strength of the tractor and the kind of work to be done by the implement. The base plate 10 is provided with a plurality of substantially V-shaped channels 11 which extend transversely across the front face of the base plate 10, or vertically thereof. A plurality of teeth 12 are fitted in the channels 11 and the base plate 10 and teeth are inclined rearwardly from the bottom toward the upper ends thereof, as shown in Figures 3 to 5 inclusive.

Figure 6:
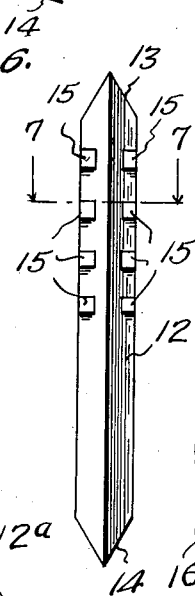
Figure 6 is a front elevational view of one of the teeth.
Figure 8:
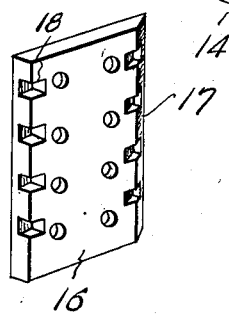
Figure 8 is a perspective view of one of the teeth-retaining or holder-plates.
Figures 7, 10:
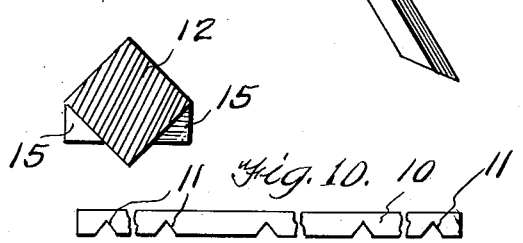
Figure 7 is an enlarged transverse sectional view taken on line 7—7 of Figure 6.
Figure 10 is a fragmentary top plan view of the base plate.

As shown in detail in Figures 6 and 7, the teeth 12 are preferably square in cross-section. The rear corners or edges of the teeth fit in the substantially V-shaped channels of the base plate 10 and the forward corners or edges face in a forward direction as shown in Figures 1 and 2. Each tooth 12 is provided with a pointed upper end 13 and a pointed lower end 14. Each tooth 12 is also provided with spaced lugs 15 upon the two converging forward faces, as shown in detail in Figures 6 and 7 and these lugs 15 are arranged in spaced longitudinal alignment and are also arranged in pairs transversely of the teeth 12.

The teeth 12 are firmly held within the channels 11 by means of the teeth-retaining or holder-plates 16, and these plates 16 are provided with beveled side teeth-engaging edges 17 which fit snugly in engagement with the converging forward faces of the teeth 12 to retain the teeth 12 within the channels 11. The beveled side edges 17 of the plates 16 are provided with notches 18 which are shaped to snugly fit over the lugs 15 and hold the teeth 12 against longitudinal displacement or sliding movement within the channels 11. The plates 16 are anchored in clamped position over the teeth 12 by means of the bolts 19 which pass through the plates 16 and through the base plate 10.

Figure 5:
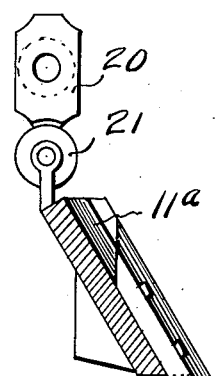
Figure 5 is a sectional view taken on line 5—5 of Figure 2.

As shown in Figures 1, 2 and 5, the central tooth 12ª is preferably shorter than the other teeth 12, so that the tooth 12ª will not interfere with the connection 20 of the tractor which engages the connecting eyes 21 carried at the center of the base plate 10.

The base plate 10 is carried by end plates 22 which are secured in any desired manner to the tractor push arms 23. These arms 23 may be of any type or design and may engage the end plates 22 and the base plate 10 in any conventional manner without departing from the spirit of the invention. A brace of any type may engage the eye 24 carried at the upper rear end of each end plate 22. One portion of the push arm 23 at each end of the base plate 10 preferably engages a suitable slotted lug 25 carried upon the rear face of the base plate 10 near each end of the plate 10—see Figure 1 and also Figure 4.

Figure 9:
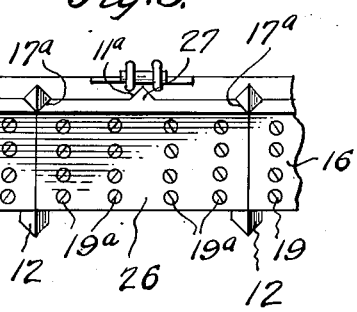
Figure 9 is a fragmentary top plan view of a modified form of the attachment showing the pusher-plate which replaces the center tooth when the device is used to push down trees which are too large to be removed by the teeth.

As shown in Figure 9, the center front plates 16 and center tooth 12ª may be removed when it is desired to do so and may be replaced by a pusher-plate 26. This pusher-plate 26 is provided with a tapering rib 27 which fits in the central channel 11ª from which the central tooth 12ª has been removed. This pusher-plate 26 is retained in position by means of bolts 19ª and the beveled side edges 17ª engage the adjoining teeth 12 in a manner similar to that illustrated and described with respect to Figures 1 and 2.

It should be understood that the tractor arms 23 may vary in length and design according to the size of the tractor, and any type of hitch may be employed without departing from the spirit of the invention. The present invention therefore embodies the base plate structure, its mounting, and the teeth, and means for securing the teeth in place as well as the pusher-plate structure shown in Figure 9. It should be further understood that certain changes may be made in detail construction without departing from the spirit of the invention so long as these changes fall within the scope of the appended claims.

As shown in Figures 1 and 2, the teeth 12 may extend slightly above the upper smooth edge of the clamping plates 16 and the base plate 10, so as to facilitate the passing of particles over the top edge of the implement. For the same reason all of the bolts 19 and 19ª are preferably countersunk. The present device is especially adapted for clearing land and for uprooting trees as well as removing stumps and roots from the ground, the present device preparing the ground in an efficient manner so as to leave the land clear and in such a condition that a mower or any other piece of farming machinery may be immediately used.

The present device has been designed as an attachment to be used upon the front end of any type of crawler tractor whether the tractor be cable-operated or operated by a hydraulic lift. The device may be adapted to either type of power unit. Furthermore, the length of the blades may be varied without departing from the spirit of the invention, to permit a more or less number of teeth to be used. It should be understood that the teeth 12 and 12ª may be adjusted as to length by placing the teeth in varying positions to cause the lugs 15 to register with selected notches 18 in the plates 16. By using this device in front of a tractor, the driver is enabled to see the work at all times and is able to regulate the depth of the teeth by the use of the control lever since the entire blade may be raised and lowered in the conventional manner. The teeth as above stated may be individually adjusted to allow the surface to be broken at a depth to suit and to lessen the burden on the driver or operator. The device may be used to give a rolling pushing action, or may be used to carry a number of trees or great piles of brush and rubbish to a selected location. By adjusting the teeth the desired clearance may be obtained between the surface to be broken and the bottom edge of the plate so that dirt or any particles may pass between the teeth and not become clogged under the blade.

As stated above, the pusher-plate shown in Figure 9 may be used in place of the center tooth when it is desired to push down trees which are too large to be broken up by the teeth. By means of the present device, a wooded area may be cleared and cultivated in one operation.

Having described the invention, what is claimed as new is:

A grubbing attachment for tractors comprising a base plate having a plurality of channels extending transversely across the front face thereof, a plurality of teeth fitted in said channels, a plurality of teeth-retaining plates secured to the base plate intermediate the teeth, each plate having a pair of bevelled parallel side teeth-engaging edges, one retaining plate fitting between two spaced teeth to facilitate removal of the individual teeth, each tooth having rearward tapering sides fitting in the channels of the base plate and forwardly tapering sides, the forward tapering sides of each tooth being engaged by the bevelled teeth-engaging edges of adjoining teeth-retaining plates, means fastening the teeth-retaining plates upon the base plate to lock the bevelled edges of the plates in clamped relation upon the forward tapering sides of the teeth and to lock the rearward tapering sides of the teeth in the transverse channels of the base plate, said teeth and bevelled side edges of the retaining plates having interfitting lugs and sockets to lock the teeth against transverse movement across the face of the base plate, all of the plates extending flush with respect to each other and the plates defining a flat uninterrupted surface across the front of the attachment from the top to the lower edges of the plates to facilitate the shedding of material falling upon the front face of said plates.

TAYLOR A. GUESS.

REFERENCES CITED

The following references are of record in the file of this patent:

UNITED STATES PATENTS

| Number | Name | Date |
|---|---|---|
| 215,975 | Reynolds | May 27, 1879 |
| 1,530,350 | Cassada | Mar. 17, 1925 |
| 1,860,805 | Cook | May 31, 1932 |
| 1,959,847 | Van Buskirk | May 22, 1934 |
| 2,081,192 | Allen et al. | May 25, 1937 |

FOREIGN PATENTS

| Number | Country | Date |
|---|---|---|
| 82,621 | Sweden | Feb. 19, 1935 |